Sept. 20, 1932.  J. V. BREISKY  1,878,669

RELAY SYSTEM

Filed Nov. 21, 1927   3 Sheets-Sheet 1

INVENTOR
John V. Breisky.
BY
Wesley G. Carr
ATTORNEY

Sept. 20, 1932.   J. V. BREISKY   1,878,669
RELAY SYSTEM
Filed Nov. 21, 1927   3 Sheets-Sheet 2
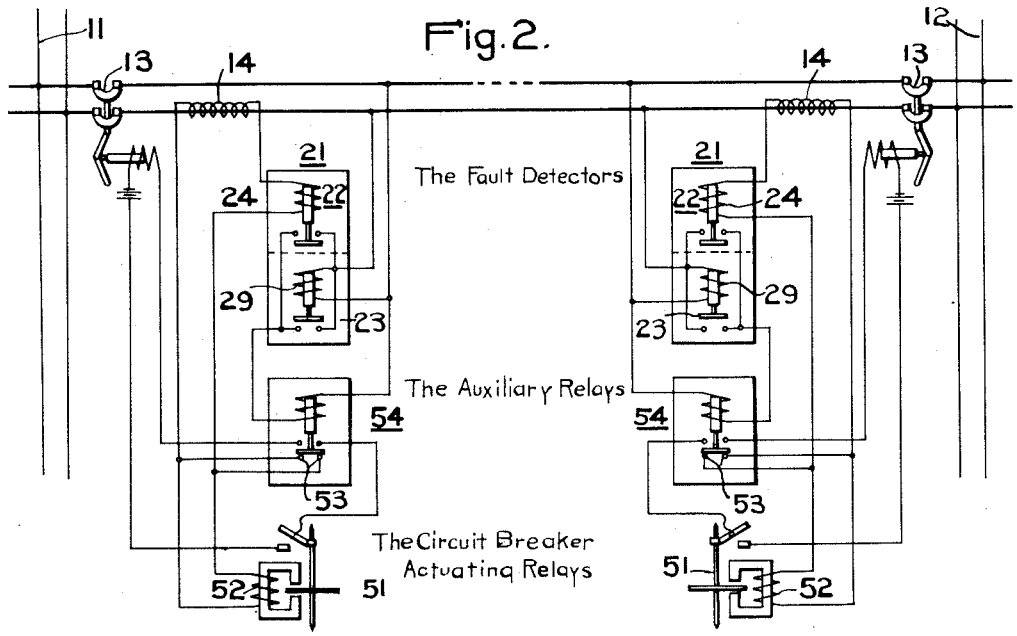
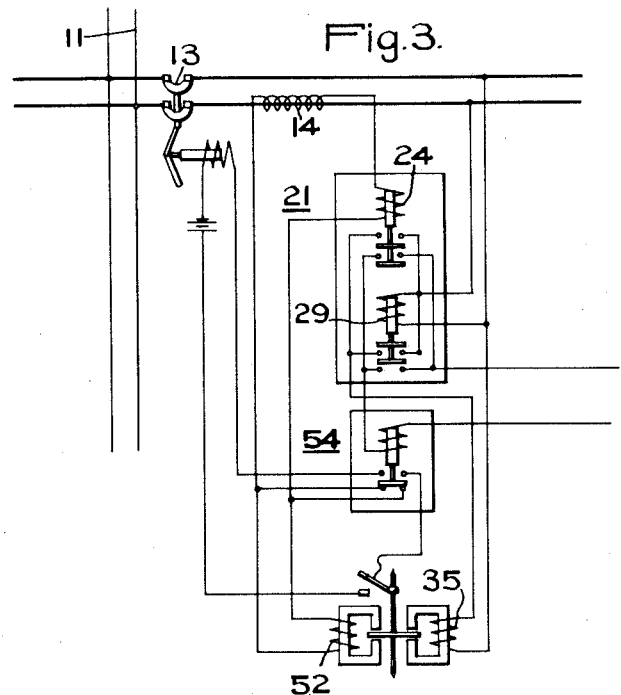
INVENTOR
John V. Breisky.
BY
ATTORNEY Sept. 20, 1932.  J. V. BREISKY  1,878,669
RELAY SYSTEM
Filed Nov. 21, 1927  3 Sheets-Sheet 3
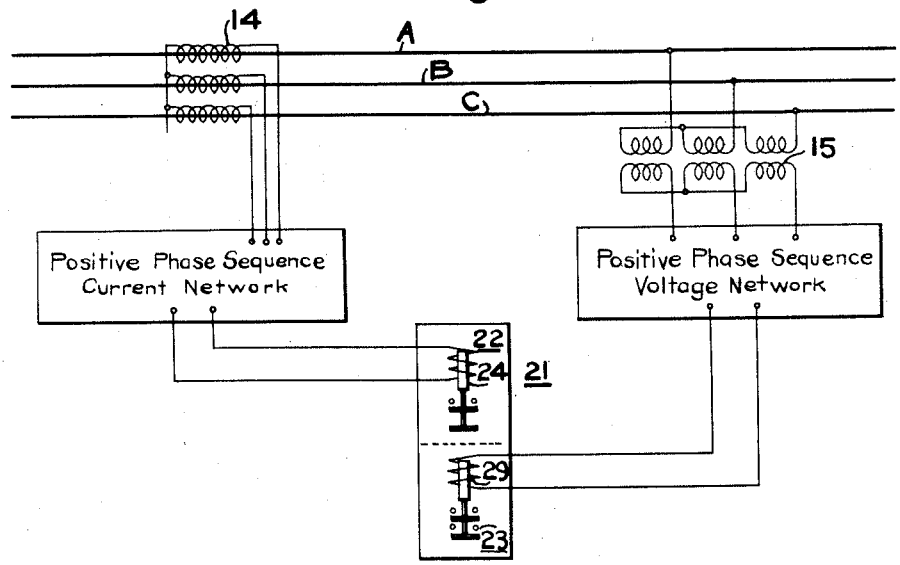
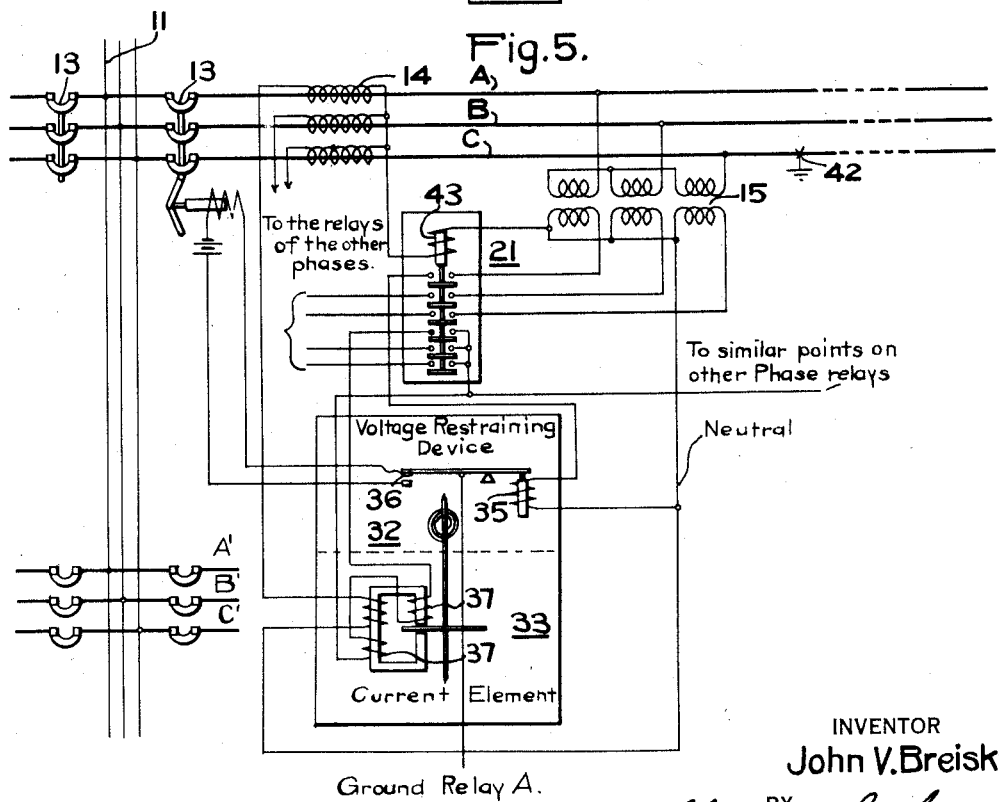
INVENTOR
John V. Breisky.
BY
Wesley S. Carr
ATTORNEY Patented Sept. 20, 1932

1,878,669

UNITED STATES PATENT OFFICE

JOHN V. BREISKY, OF PITTSBURGH, PENNSYLVANIA, ASSIGNOR TO WESTINGHOUSE ELECTRIC & MANUFACTURING COMPANY, A CORPORATION OF PENNSYLVANIA

RELAY SYSTEM

Application filed November 21, 1927. Serial No. 234,647.

This invention relates to protective-relay apparatus and circuit-breaker-control systems and particularly to systems having the circuit-breaker-control relays normally ineffective.

The principal objects of my protective apparatus are as follows:

To provide a protective apparatus and a protective relay which shall be responsive to a fault current of magnitude less than a normal full-load current.

To provide a protective apparatus that shall discriminate between a fault condition and a load condition.

To provide a means, responsive to an over-current and an undervoltage, or either of them separately, in a power line, for controlling the connections of a line to the rest of the power system.

To provide a device which shall supervise the energization of a relay for controlling a circuit breaker.

To provide a protective system having a device normally effective for controlling a device normally ineffective, the latter being provided for controlling a circuit interrupter.

To provide a protective system which shall render a voltage-restraining element relatively sensitive.

To provide a means for discriminating between a load supplied by a source of power capacity of large magnitude and a fault supplied by a source of small magnitude.

To provide a fault-detecting device.

To provide a means for automatically connecting a relay into service when a fault occurs.

To provide a protective apparatus which shall remove the relay burden from the line current transformers except under fault conditions.

To provide a low-current-range device for actuating a circuit interrupter, the range being normally below values corresponding to the full-load normal current.

To fully meet the requirements of protective relay equipment applicable to interconnections of power lines, the relays must be capable of operation on fault currents which may be less, in magnitude, than normal full-load current. In order to satisfy this requirement, this protective system and fault-detecting device and auxiliary relay have been developed.

The fault-detecting device is composed of an under-voltage and an over-current element connected in each phase of the power lines to be protected when the system is of the alternating-current type. The contacts of these elements, each of which may have two per phase or a total of six for a 3-phase power system, are connected in parallel so that a condition of either an under-voltage or an over-current or both occurring relative to the power system will cause the relay contacts to be closed or actuated.

In applying this device, the over-current element is usually adjusted or set to operate at a definite current value, for example 125% of the maximum load which is expected in practice. The current relays should therefore never operate unless relatively heavy fault currents are flowing. The under-voltage device is usually set for say, 75% of the normal voltage.

The principle of operation of this combination is as follows. When a fault occurs, if the distribution of generating capacity is such that the bus voltage will not drop below approximately 75% of normal, the current to a fault near the bus must necessarily be of large magnitude. On the other hand, if the magnitude and distribution of the generating capacity is such as to permit only a relatively small current to flow to the fault, the bus voltages near this fault must necessarily be of relatively small magnitude. As a result, either the over-current element or the under-voltage element of the relay will operate when a fault occurs that is so located as to demand their operation for proper clearing. In order to fully meet the various conditions which exist in practice, both the over-current and the under-voltage relays have a suitable range of adjustment.

Figure 1 is a diagram illustrating my protective apparatus as applied to a three-phase power system utilizing impedance distance relays for the isolation of line-to-line faults;

Fig. 2 is a diagram illustrating my protective apparatus in a more simplified form, as applied to an over-current relay and illustrating one variation of the method of rendering the operating coil of the relay normally deenergized;

Fig. 3 is a diagram illustrating, in simple form, the method of normally disconnecting from service both the current actuating coil and the voltage restraining coil of a circuit-breaker-actuating relay;

Fig. 4 is a diagram illustrating the utilization of a positive-phase-sequence current network, a positive-phase-sequence voltage network, a fault-detecting device, and a relay operating on positive-phase-sequence current or voltage or both in place of the plurality of relays and fault-detecting devices illustrated in Fig. 1;

Fig. 5 is a diagram illustrating my protective apparatus specifically applied to a three-phase power system for protection against ground faults only.

The fundamental principle of this invention may be stated as follows:

A device which may be called a fault-detecting device and which is responsive to an overcurrent or an under-voltage, or both, is provided for the purpose of detecting a fault condition and for translating notice of such fault condition to the circuit-breaker-actuating relays which are made ready to function only upon actuation of the fault-detecting device. In other words, the fault-detecting device is a means responsive to a fault for controlling the circuit-breaker-actuating relays and keeping them normally ineffective but which upon the occurrence of a fault permits the circuit-breaker-actuating relays to perform their usual functions of isolating the fault.

By way of example, this protective apparatus utilizing a fault-detecting device will be described relative to a three-phase system, as illustrated in Fig. 1, wherein is shown a section of a power system fed by a source of power from the stations 11 and 12 which terminate the ends of a section of the power line represented by conductors A, B and C.

The power system may be of the overhead or the underground type, grounded or ungrounded, or having an isolated neutral, or it may be an alternating-current system or a direct-current system of any type. But, by way of example, it will be illustrated herein with reference to a three-phase power system only.

The devices 13 are the usual circuit interrupters, circuit breakers, segregating devices or isolating devices which shall be effective, upon actuation, to control the connections of the power lines A, B and C to the rest of the power system.

The devices 14 are current transformers of the usual type connected in each phase of the power lines near to the stations 11 and 12 and effective to furnish current to the relays connected thereto that shall be proportional to the currents which flow in the power lines A, B and C.

The devices 15 are potential transformers, of the usual type, for furnishing a voltage to the relays connected thereto that shall be proportional to the voltages between the lines, or phases A, B and C.

The devices 21 may be called fault-detecting devices. Each of them comprises an overcurrent element 22 and an undervoltage element 23, which may be separate units or which may be combined in one unit according to the balance principle. The overcurrent element 22 comprises a winding 24 energized from the current transformer 14 of the phase or line A to which it is connected. The winding 24 controls a movable member which may be of the plunger type, the armature type or the induction disc type, which, upon actuation, closes the contacts 25 and 26.

The undervoltage element 23 comprises a winding 29 which is energized in accordance with the voltage of the circuit, as supplied from a phase of the power lines A, B and C stepped down through the voltage transformers 15. The winding 29 controls a movable member similar to the movable member of the over current device which, upon actuation, closes the contacts 27 and 28.

The contacts 25 and 27 are connected in parallel so that, upon actuation of either the overcurrent element 22 or the undervoltage element 23, the circuit to which the contacts 25 and 27 are connected will be closed or rendered effective.

Likewise, the contacts 26 and 28 are connected in parallel in order that, upon the closing of either set of them, the circuit to which they are connected will be closed or rendered effective.

In broad terms, the device 21 is a means responsive to either an overcurrent or an undervoltage of the power line for the purpose of controlling another relay 31 which will be described later. That is to say, upon an overcurrent occurring in the power line A, B or C, the overcurrent element 22, through its winding 24, will cause the closing of both the contacts 25 and 26. Likewise, upon the occurrence of an undervoltage between the power lines A, B or C, the undervoltage element 23, through its winding 29, will cause the closing of the contacts 27 and 28. In practice, the overcurrent element 22 should be adjusted to a value of say 125% of the maximum full-load current or to a value in excess of the maximum full-load current in order that this element 22 shall not be actuated under any conditions of normal load less than full load.

The undervoltage element, in practice, may be set to be actuated ordinarily at approximately 85% of the normal voltage so that, upon the reduction of voltage of the power line below the predetermined adjustment, the undervoltage element 23 will be actuated.

It will be observed now that the device 21 is simply a means responsive to a fault condition which, under normal conditions, keeps a relay 31 in a state of deenergization or ineffectiveness or in a state of being disconnected from service or out-of-service, but which, upon the occurrence of a fault, automatically connects the relay 31 in service, or renders it effective.

The device 31, as shown, is a circuit-breaker-actuating relay for controlling the circuit interrupter 13 in response to energization from the device 21 heretofore described. As shown, the device 31 is a power-directional impedance-distance relay having three elements; namely, the element 32, a voltage restraining element; the element 33, a current actuating element and the element 34, a power-directional element. In construction, the device is similar to the ordinary impedance relay now in use except that its windings 35 and 37, being normally in a state of deenergization, may be constructed to be much more sensitive and of smaller current-carrying capacity.

The windings 37 of the current element 33, when energized as a result of the operation of the device 21, tend to cause the relay contacts 36 to close and thus actuate the tripping of the circuit interrupter 13. The action of the current element 33 is opposed or restrained by the voltage element 32 resulting from the actuation of the voltage winding 35 whenever the device 21 renders it operative or effective.

The power-directional element 34 is the usual one which permits its contacts to close only when the power produced by fault connection is flowing in the proper direction.

In broad terms, the device 31 is simply a means, responsive to the detecting device 21, for controlling the circuit interrupter 13.

It should be observed that the voltage restraining winding 35 may be constructed to have great sensitivity and a smaller continuous current-carrying capacity than pertained to devices heretofore used because it is energized only upon the occurrence of a fault, such as the fault 41.

The voltage on the under-voltage element of the fault detector and the voltage on the voltage-restraining element of the circuit-breaker-actuating relay if such relay was a voltage restraining element, should be the same phase voltage.

But the voltage element of the directional element, when used, need not be the same phase voltage as that of its associated fault detector but may be any one of the three-phase voltages which will give the correct directional operation.

In the system shown, one device 21 and one device 31 are utilized per phase, or in this three-phase system, there are three of each of these devices per feeder in each station.

Under normal conditions of operation, power may be fed from the stations 11 and 12 or from other stations connected thereto and current is flowing into the power lines A, B and C, the circuit interrupters 13 being in closed position. The winding 24 of the overcurrent element 22 of the fault-detecting device 21 is energized, but, because of predetermined adjustments, insufficient current is flowing to cause the closing of its contacts 25 and 26. Likewise, the voltage winding 29 is energized by a voltage that is proportional to normal voltage of the line and, accordingly, holds the contacts 27 and 28 open.

The line relay 31 is deenergized or ineffective and disconnected from service. That is to say, the circuit which contains the windings 37 of the current element 33 is open circuited and, consequently, deenergized. Similarly, the voltage restraining winding 35 is open circuited because the contacts 26 and 28 are in open position. The contacts 36 also are in open position, and, therefore, the circuit interrupter 13, associated with the relays, is undisturbed.

When a fault occurs, such as the fault 41, there will either be a reduction in voltage between the lines A, B and C, or an overcurrent in the lines A, B and C, or both. If the source of power is of a relatively great capacity the voltage may not drop an appreciable amount, but there will be an overcurrent. On the other hand, if the generating capacity be of small magnitude, there may be no appreciable overcurrent, but there will be an undervoltage produced. Therefore, upon the occurrence of the fault 41, the fault-detecting device 21 will be actuated to close the circuits connected to current windings 37 and the voltage restraining winding 35, the result of which will be to permit the line relay 31 to operate and actuate its associated circuit interrupter 13 and isolate the fault which it is pre-adjusted to deal with.

Instead of utilizing the three overcurrent elements 22 and the three undervoltage elements 23, as illustrated in Fig. 1 for the protection of a three-phase power system from line-to-line faults, one positive-phase-sequence network of the usual type and one positive phase sequence voltage network of the usual type and one fault-detecting device 21 may be utilized at each end of the line to be protected. This is illustrated in Fig. 4.

In place of an impedance relay, as illustrated in Fig. 1, a relay of any type or means for controlling the actuation of a circuit interrupter may be utilized. For example, in Fig. 2, the fault-detecting device 21 is shown as controlling an ordinary overcurrent relay which may be of the induction type, or otherwise. In Fig. 2, a variation in the method of rendering the relay 51 ineffective is shown. This variation consists in normally short circuiting the actuating winding 52 to render it ineffective and to keep it normally in a state of deenergization. Upon the occurrence of a fault, the short circuit is removed from the winding 52 which permits the relay 51 to be actuated to interrupt a circuit by controlling the circuit interrupter 13.

In Fig. 5 is illustrated the method of utilizing the fault-detecting device for controlling three ground relays in order to protect the power lines A, B and C and isolate them from the rest of the power system upon the occurrence of a ground fault, such as the ground fault 42. This is a special application of my invention. Although its general operation is the same as that heretofore described, in particular, it differs in that the winding 43 of the fault-detecting device 21, is connected in the neutral circuit and is energized only upon the occurrence of a ground fault because no current can flow in this ground-neutral connection in the absence of a ground fault.

Upon the occurrence of a ground fault 42, the winding 43 is energized to close the contacts of the device 21, thereby energizing all of the ground relays associated with it and permitting them to perform their usual function of controlling the circuit interrupter 13. In the connections, as shown in Fig. 5, three ground relays are utilized to be responsive to the actuation of the single ground detector 21.

Various means may be used for rendering the ground relays deenergized and disconnected from service, and ineffective normally, such as that shown and, in addition, the method of short circuiting a main current coil normally, or by utilizing another secondary coil on the main pole and to parallel it with the regular secondary coil wound in an opposite direction. The object is simply to render the relays ineffective and disconnected from service under normal conditions of operation and, upon the occurrence of a fault, to render them operative, or effective, and energized and connected to their circuits.

These fault-detecting relays are utilized preferably in conjunction with low-current relays or relays of small current capacity in such a manner as to render the protective relays ineffective until a fault occurs. The fault-detector relays may be used in combination with directional relays, connected in a similar manner to that shown in Fig. 1, in conjunction with parallel line balanced protection to prevent faulty operation on switching the lines in and out of service, and which are not adequately taken care of by arrangements heretofore used.

One of these conditions occurs only when the low-set relays have current settings just over full-load current values. The faulty operation is caused when an operator at a receiving substation trips one of the breakers on a pair of parallel lines which is carrying nearly full-load current. This causes all of the current to flow over one line and this line will have faulty isolation at the sending end by the operation of the low-set relays. To correct this condition of trouble, the fault-detector devices 21 and the apparatus of this invention may be utilized. The contacts of the fault-detector relay 21 are so connected as not to permit the low-setting, overcurrent contacts of the relay 31 to cause tripping of the circuit breaker 13 unless a fault occurs on the system. The low-setting relays 31 may, therefore, be given a current setting of any value without danger of tripping because of this operating condition.

In summary, the principal advantages of this protective arrangement are as follows:

It provides a protective apparatus which will isolate a fault of magnitudes smaller than a normal full-load current. In other words, it will discriminate between a fault condition and a load condition although the latter may exceed the former in magnitude.

It permits a very sensitive adjustment of the circuit-breaker-actuating relays.

The circuit-breaker-actuating relay windings are normally deenergized and, consequently, may be constructed to have a minimum continuous current-carrying capacity.

Normally, the current transformers connected to the relays may be made to be substantially unburdened by the relays.

It permits the voltage restraining element, when utilized, to be normally deenergized. It may thus be made more sensitive, since its thermal or continuous-current-carrying capacity need not be as large as if full voltage were continuously applied.

I claim as my invention:

1. In a protective apparatus, the combination with a power line having circuit breakers and actuating means therefor, of a relay normally ineffective and disconnected from service for controlling its associated circuit interrupter and means responsive to either an undervoltage or an overcurrent of the power line for electroresponsively connecting the relay into service when a fault occurs.

2. In a protective apparatus for the protection of a power line in an alternating-current system of distribution, the combination of a normally energized fault-detecting device comprising an over-current element and an under-voltage element, a relay normally ineffective for controlling the connections of the power line to the system of distribution, said relay including a voltage-restraining element, and means whereby the relay is actuated on the occurrence of a fault by the actuation of either the over-current element or the under-voltage element of the said fault-detecting device.

3. The combination, in protective apparatus for controlling the connections of a power line in a power system including a fault-detecting device, a relay including a voltage-restraining element for controlling the connections of the power line to the system, and means whereby the voltage-restraining element is energized only when the fault-detecting device has been actuated as a result of fault conditions.

4. The combination, in a protective means for controlling the connections of a power line to a system of distribution, of a fault-detecting device comprising an over-current element and an under-voltage element, a relay including a normally deenergized voltage-restraining element for effecting said control, and means whereby the actuation of either the over-current element or the under-voltage element of said fault-detecting device results in the effective energization of said relay and said voltage-restraining element.

5. The combination, in protective apparatus for controlling the connections of a power line to a system of distribution, including a fault-detecting means and a normally ineffective relay electrically associated with said fault-detecting means and adapted to be energized thereby for selectively effecting said control, said relay including a normally deenergized voltage-restraining element, a current element and a directional element.

6. The combination, in a protective means for controlling the connections of a sectionalized power system, of a fault-detecting device comprising an over-current element and an under-voltage element, and an impedance relay electrically associated with said fault-detecting device, and including a normally deenergized voltage-restraining element, a current element, and a directional element, said impedance relay so connected and arranged to be energized by said fault-detecting device to effect the selective control of the connections of a faulty section upon the effective energization of said fault-detecting device.

7. The combination with an impedance relay for controlling the connections of a power line in a power system, of fault-detecting means including an over-current element and an under-voltage element energized by the positive phase-sequence components of current and voltage of said system, respectively, and means whereby a fault on said power line effects the actuation of either the over-current element or the under-voltage element to energize said relay.

8. In a protective apparatus, the combination with a power line, of impedance relay means normally disconnected from service for controlling the connections of the line to the rest of the power system, and means responsive to a fault for connecting the said relay means into service only during the continuation of the fault, said means being energized in accordance with the positive phase-sequence components of current and voltage in the power line.

9. In a protective apparatus for a sectionalized power system, the combination with a relay for controlling the connections of a faulty section of said system, of a fault-detecting means electrically associated with said relay and comprising an over-current element and an under-voltage element energized in accordance with the positive phase-sequence components of current and voltage in said section, respectively, said fault-detecting means operable to effect the energization of said relay whereby said relay is actuated to selectively effect said control.

In testimony whereof, I have hereunto subscribed my name this 19th day of November, 1927.

JOHN V. BREISKY.